United States Patent Office 2,794,131
Patented May 28, 1957

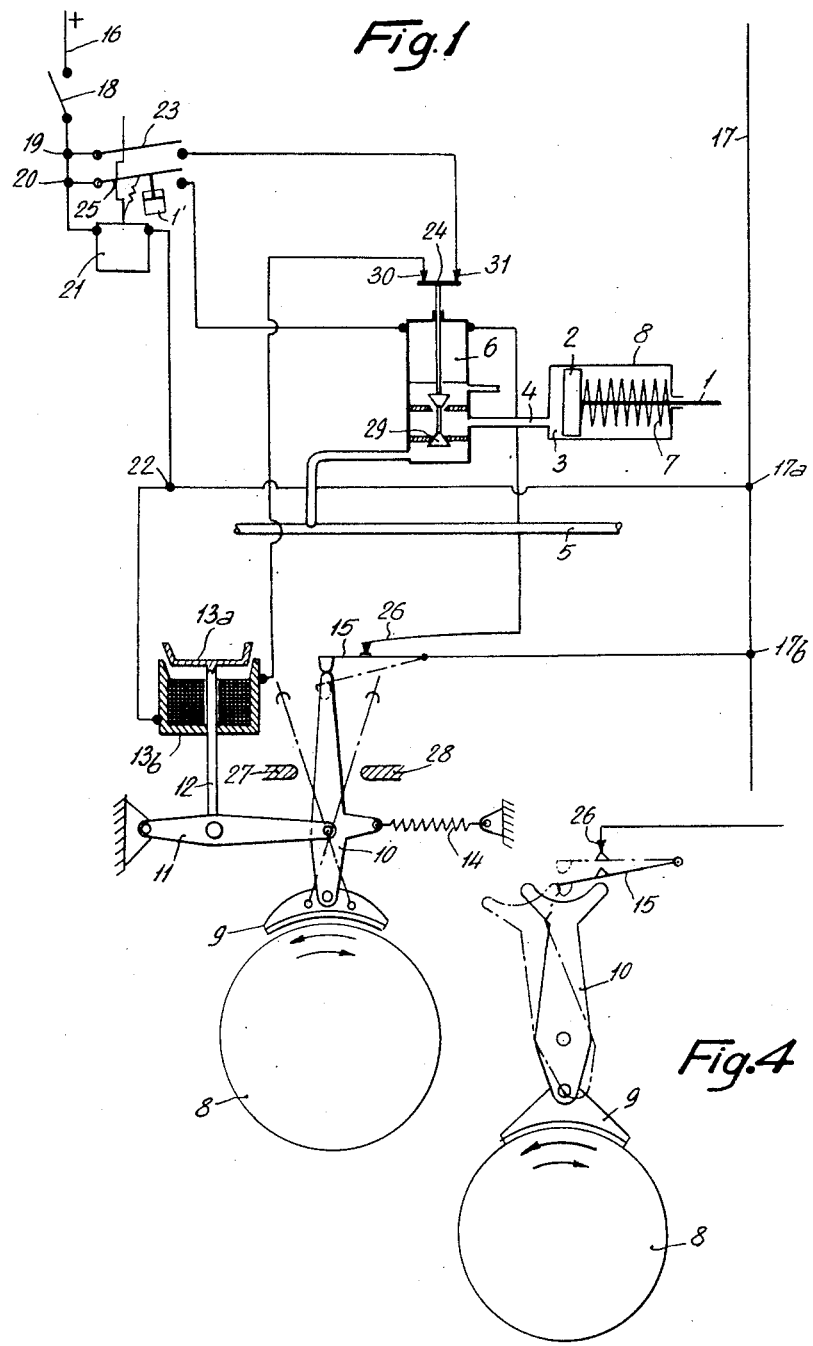

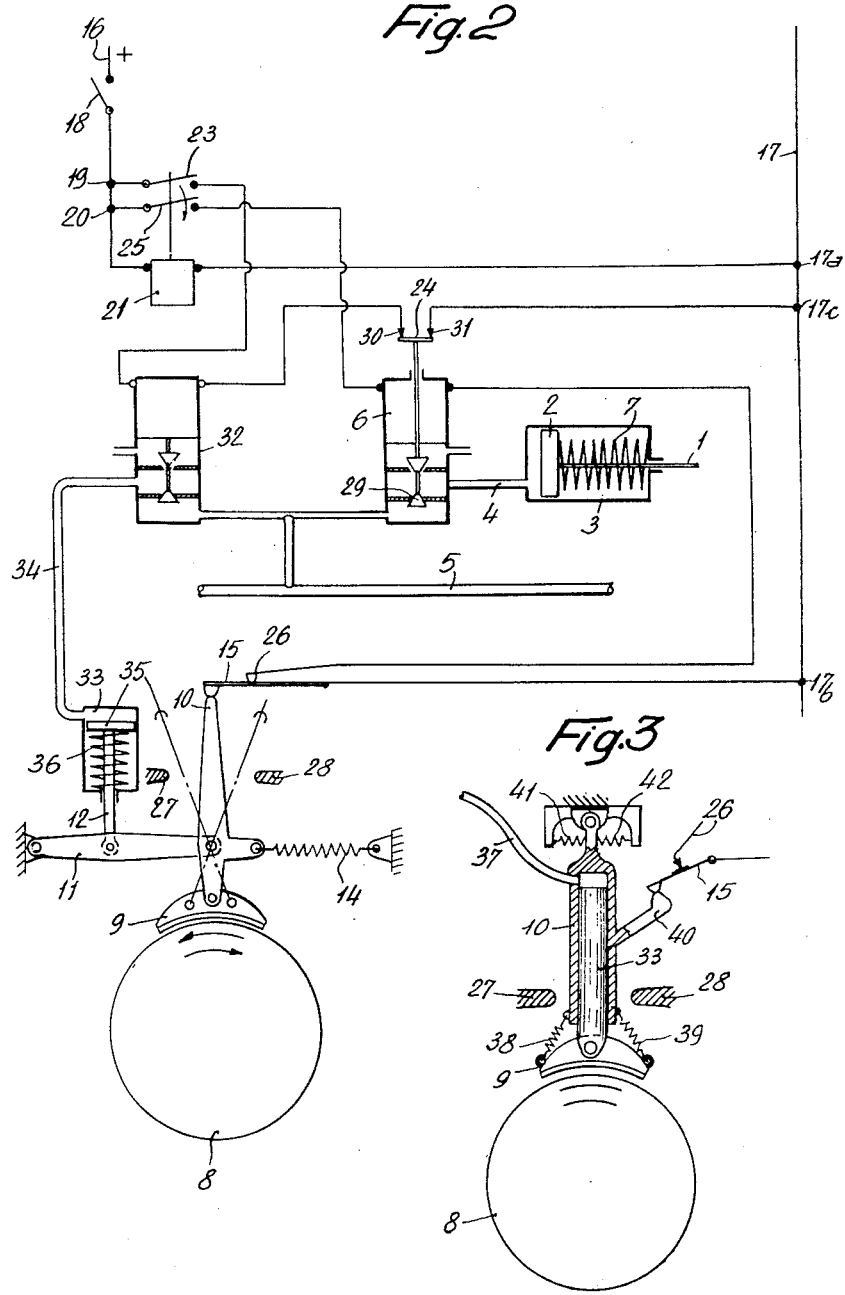

2,794,131

TRANSMISSION DRIVES

Lucien Peras, Billancourt, France, assignor to Regie Nationale des Usines Renault, Billancourt, France Application March 9, 1954, Serial No. 415,081

Claims priority, application France March 31, 1953

7 Claims. (Cl. 307—120)

The invention relates to a device for making the drive of a member or of a group of members, and more particularly a direct or indirect electrical drive, dependent on the state of movement or rest of another member, said device comprising a feeler in contact with a controlling member, and said feeler acting on an electric circuit, thus permitting or preventing the driving of the controlled member.

It may be necessary in certain mechanism not to cause the setting in motion or the displacement of one or more members except when other members are stationary, and it may then be essential to connect these members by means of an automatic safety device preventing any starting of the driven members until the moving member has come to rest.

The device forming the subject of the invention permits the setting in motion of one machine part to be dependent on the stopping of a member previously in motion, or alternatively, on the movement of a member, thus ensuring the complete protection of a mechanism subject to the conditions explained above.

There will now be described, by way of non-limiting example, two embodiments of a device according to the invention applied to a road or rail vehicle, on which it prevents the actuation of the reverse gear or reduction gear by the engagement of dog clutches, until these have come to rest, are hereafter described by way of example, with reference to the accompanying drawings, in which:

Figure 1 is a diagrammatic representation of one such device;

Figure 2 is a diagrammatic representation of a second embodiment of such a device;

Figure 3 shows a modification of the feeler of the device;

Figure 4 illustrates yet another modification of the feeler.

Referring to Figure 1, the driving device for the dog clutch (not illustrated) consists of a rod 1, rigidly secured to a piston 2, which is displaced in a pneumatic cylinder 3, under the action of some of the compressed air conveyed by a pipe 4 in communication with a pipeline 5, the air intake being controlled by an electrically operated valve 6. The piston 2 is subject to the pressure exerted by a spring 7, in the opposite direction to that of the action of the compressed air.

On the other hand, near the rotating shaft 8, the stopping of which is to permit the engagement of the dog clutches, there is provided a feeler consisting of a shoe 9 carried by an arm 10, said arm being itself articulated on the end of a lever 11, the other end of which is fixed. The lever 11 is articulated at the end of a rod 12, which is rigidly connected to the armature 13a of an electromagnet 13b. Any displacement of the armature 13a thus causes a vertical displacement of the shoe 9. The arm 10 is also subject to the action of a spring 14, and its opposite end to the one to which the shoe 9 is articulated supports an articulated blade 15.

The connection between the two groups of members described hitherto is brought about by an electric circuit constituted as follows:

Between the terminals 16 and 17 of a source of current there is provided a first sub-circuit passing through the switch 18, the connections 19 and 20, the relay 21, the connection 22 and the connection 17a. A second sub-circuit starts from the connection 19 and passes through the switch blade 23 controlled by the relay 21, and switch blade 24 controlled by the electrically operated valve 6, the electro-magnet 13b, the connection 22 to terminate at the connection 17a. A third sub-circuit starts from the connection 20 and passes through the switch blade 25 controlled by the relay 21 and a time-delay device not illustrated; the electrically operated valve 6, the resilient blade 26, the articulated blade 15 and terminates at the connection 17b.

The operation of the device is as follows:

When the driver wishes to engage the dog clutches and thinks they are at rest, he closes the switch 18, thus completing the first circuit 16—18—21—17a. The relay 21 is thus energised, attracts the switch blade 23 and tends to attract the switch blade 25. This is retained, however, by the time-delay device, preventing its displacement during a specified period of time.

Since the switch blade 23 is closed, the second sub-circuit 19—23—24—13b—17a is completed. The electro-magnet 13b is therefore energised and attracts its armature 13a, the result of this displacement being to bring the shoe 9 into contact with the shaft 8. The articulated blade 15 follows the movement of the arm 10 but nevertheless maintains the connection with the contact provided at the end of the flexible blade 26.

If the shaft 8 is still turning, it will drive the shoe 9 which will have the effect of causing the lever 10 to oscillate about a certain angle and of causing it to strike against stops 27 or 28, according to the direction of rotation of the shaft 8. The articulated blade 15, which is no longer supported by the arm 10, then drops such a distance that the connection with the contact of the blade 26 is broken. When the time-delay device has released the switch blade 25, and the latter, attracted by the relay 21, has closed its contact, the third sub-circuit for energising the electrically operated valve 6 will not have been completed because of the broken contact between 15 and 26. The driver will open the switch 18 and the whole device returns to the position shown in Figure 1.

When the driver again tries to engage the dog clutches, he again closes the switch 18. As before, the first and the second sub-circuits are completed and the shoe 9 comes into contact with the shaft 8. If this is stationary, no break will occur in the connection between 15 and 26. As soon as the time-delay device has released the switch blade 25, the latter will complete the third sub-circuit 20—25—6—26—15—17b. The electrically operated valve 6 is then energized, a valve 29 of which opens and the switch blade 24 moves away from its two contacts 30 and 31. The opening of the valve 29 permits the admission of air to the cylinder 3, the displacement of the piston 2 and the engagement of the dog clutches. The break in the contact between the switch blade 24 and the contacts 30 and 31 will have the effect of de-energising the electro-magnet 13b and consequently of causing the shoe 9 to rise again. When the operator wishes to restore the clutch to the neutral position, he opens the switch 18. The electrically operated valve 6 is de-energised, the valve 29 closes and the spring 7 pushes back the piston 2. The whole device is then back in its original position.

Figure 2 illustrates another embodiment of the device in which the electro-magnet 13b has been replaced by an electrically operated valve 32 and a pneumatic cylinder 33 connected by a pipe 34. The operation of the device is the same as that described above except that the closing of the switch blade 23 energises the electrically operated valve 32 and a pneumatic cylinder 33 connected by a pipe 34. The operation of the device is the same as that described above except that the closing of the switch blade 23 energises the electrically operated valve 32 which permits the entry into the cylinder 33 of compressed air coming from the line 5. The vertical movement of the shoe 9 is then controlled by the displacements of the piston 35, the return stroke of which is carried out under the action of a spring 36. This circuit is connected to a connection 17c.

In the modification of the feeler shown in Figure 3, the pneumatic cylinder 33 in Figure 2 has been incorporated in the arm 10 of the feeler, the cylinder being connected to the electrically operated valve 32 by a flexible pipeline 37. The shoe 9 is restored to the horizontal position by the action of springs 38 and 39. The limitation of the oscillating movement of the feeler is obtained, as before, by the stops 27 and 28. The control of the contact 15, 26 is likewise ensured by a device similar to that shown in Figures 1 and 2, the blade 15 resting on a lateral arm 40 of the feeler. The feeler is restored to the central position by springs 41 and 42.

It may, on the other hand, be necessary to make the driving of one member dependent on the movement of another. That is to say that, in the embodiments described, the actuation of the driving rod 1 should not take place except when the shaft 8 is rotating. It is then sufficient to modify the feeler as shown in Figure 4, the contact 15, 26 only being closed when the arm 10 occupies one of its extreme positions.

Modifications could be made to the embodiments described above within the scope of the present invention. Thus the displacement of the member to be actuated, for example dog clutches, could be made dependent on the detection of the movement of two or more members, such as the primary and secondary shafts in a change-speed or reverse gear. Similarly the feeler could, instead of a rotary movement, detect a rectilinear motion, the shape of the shoe then being adapted to such movement.

Any means of driving the driven member could obviously be made dependent on the feeler detecting device, provided that the driving means in question were electric or combined with an electric circuit.

I claim:
1. Apparatus for inhibiting the operation of a controlled member in response to a given motional state of a movable member comprising feeler means, a second means including a first electrical circuit for bringing said feeler means into contact with the movable member, a third means including a second electrical circuit for actuating the controlled member, said second electrical circuit including a switch, said feeler means, when in contact with the movable member, being movable thereby for controlling said switch, said electrical circuits including simultaneously actuable circuit-closing means, the circuit-closing means in the second electrical circuit including time-delay means for delaying the closing of the second electrical circuit to provide time for the stabilization of the response of the feeler means to the movable member.

2. Apparatus according to claim 1, wherein said feeler means comprises a lever device and said second means includes an electromagnet connected to the lever device for actuating the same.

3. Apparatus according to claim 1, wherein said feeler means comprises a lever and said second means includes a pneumatic cylinder, an electrically operated valve means for said cylinder and a piston in said cylinder connected to said lever.

4. Apparatus according to claim 1, wherein said second means includes a pneumatic cylinder, said feeler means forming a piston in said cylinder.

5. Apparatus according to claim 1, wherein said feeler means opens said switch and prevents the third means from actuating the controlled member when the movable means is in motion.

6. Apparatus according to claim 1, wherein said feeler means opens said switch and prevents the third means from actuating the controlled member when the movable member is at rest.

7. Apparatus according to claim 1, wherein the circuit-closing means includes a single relay which includes contacts in said first and second circuits and said time-delay means being connected to the contacts in the second circuit.

References Cited in the file of this patent
UNITED STATES PATENTS

| | | |
|---|---|---|
| 1,797,602 | Bryson | Mar. 24, 1931 |
| 2,464,998 | Stevens | Mar. 22, 1949 |
| 2,627,168 | Stevens | Feb. 3, 1953 |